United States Patent Office 3,476,711
Patented Nov. 4, 1969

3,476,711
PROCESS FOR THE PREPARATION OF POLYAMIDE POWDERS PROCESSING HIGHER VISCOSITIES
Karl Adolf Muller, Frederico Engel, and Armin Gude, Marl, Germany, assignors to Chemische Werke Huls Aktiengesellschaft, Marl, Germany, a corporation of Germany
No Drawing. Filed Aug. 29, 1966, Ser. No. 575,566
Claims priority, application Germany, Oct. 12, 1965,
C 37,128
Int. Cl. C08g 20/02, 53/00
U.S. Cl. 260—78                                 4 Claims

ABSTRACT OF THE DISCLOSURE

Relatively low-molecular weight polyamides—not fully condensed and normally undesirably brittle—are convertable into products of high viscosity and homogeneous quality by subdividing the brittle material at a temperature of from −50° to 150° C. and then heating the resulting powder at a temperature of at least 140° C. and approaching but definitely lower than the melting point of the polyamide. Preferably, the heating of the powder is effected in an inert atmosphere. The resulting higher molecular weight, higher viscosity, material is in the form of round uniform particles eminently suitable for use in flame-spraying and vortex-sintering processes.

---

It is known to prepare polyamide powders by reprecipitation from solvents, for example alcohols. Processes of this type however are very complicated and costly due to the large quantities of solvent required. The perparation of highly viscous (high molecular weight) polyamide powders by grinding would be a more appropriate method but this operation meets with difficulties because of the toughness of highly viscous polyamides. The products so obtained are not round particles, as required for example in case of flame-spraying or vortex-sintering, but are fibrous.

It is further known that it is possible to obtain polyamides with high molecular weights by heating polyamides of medium molecular weight to temperatures below their melting point, e.g. 160 to 200° C.

It has now been found that high-viscosity polyamide powder can be prepared without any difficulties if low-molecular polyamides which are brittle are transformed into powder by grinding and the resulting polyamide powder is then brought to the desired viscosity by heating to temperatures below its melting point. The product is in the form of uniformly round particles.

Suitable for the process of the present invention are polycondensation products of ω-aminocarboxylic acids or their lactams with more than 5 C-atoms, as well as mixtures thereof, or mixed with less than 50% of other substances, for example with polyamides of diamines and dicarboxylic acids, or with fillers such as titanium dioxide, soot and the like, or with conditioners such as acetic acid, adipic acid, butylamine acetate and phosphoric acid.

The method of the present invention permits the preparation with great success of polyamide-6 and polyamide-11 powder, and especially and primarily polyamide-12 powder. The low-molecular polyamides are prepared by interruption of the polycondensation in the melt. The time or interruption of the polycondensation varies from polyamide to polyamide. The molecular weight must be determined by varying the conditions of the polycondensation, such as temperature, duration, pressure and the like, in such manner that the polyamide will still be brittle. This will be true, for example, in case of polyamide-6 for relative viscosities up to 1.6 and in case of polyamide-11 or polyamide-12 for relative viscosities up to 1.4.

The grinding of the low-molecular polyamides can be performed in peg mills or impact mills and can be carried out either under atmospheric air or nitrogen. During the grinding the temperature can range from −50° C. to 150° C., preferably from 20 to 100° C.

The final condensation of the polyamide powder can be performed in any equipment which permits heating up to the required temperature and which can be closed off against the atmospheric air such as tumbler-dryers or vortex dryers. The temperature of the final condensation need to be at least 140° C. and can be raised to a temperature 3° C. below the melting point of the polyamide, with preferred operating temperatures of 10 to 30° C. below this melting point. The heating must be carried out under inert gases which will not react with the polyamide, for example under $N_2$, $CO_2$, CO, $CH_4$ or other inert gases. The heating can be accomplished under pressures ranging from 1 to 50,000 mm. mercury column per $cm.^2$.

Powders prepared in accordance with the method of the invention are round particles and can therefore be utilized for vortex sintering or flame-spraying, for the manufacture of pastes as well as for the sticking together of non-woven fabrics. For vortex sintering a grain size of less than 700μ, and preferably under 300μ is required ("Kunstoff Handbuch," vol. VI, "Polyamide" (1966), page 362).

EXAMPLE 1

100 parts of laurinlactam was heated, together with 0.2 part of adipic acid and 5 parts of $H_2O$, for 4 hours at a temperature of 290° C. to 300° C. The pressure was held at 20 atmospheres gauge pressure. The contents of the vessel were then removed without prior flash evaporation. The resulting polylaurinlactam had a relative viscosity of 1.4 (measured as a 0.5% solution in m-cresol). In a peg mill it was then ground into round particles. Coatings prepared from this powder by use of the vortex-sintering method were found to be brittle.

The ground polylaurinlactam was heated to 160° C. under nitrogen for 4 hours. At the end of this time its relative viscosity was 1.6. Coatings manufactured from this powder by use of the vortex-sintering method were not brittle.

EXAMPLE 2

100 parts of caprolactam was heated, together with 5 parts of the salt of adipic acid and hexamethylenediamine, for 1 hour at a temperature of 260° C. The relative viscosity of the polycaprolactam so obtained was 1.5 to 1.6 (measured as a 1% solution in concentrated $H_2SO_4$).

The compound was ground in an impact mill and again condensed for 10 hours in a flow of nitrogen heated to 190° C. The relative viscosity of the powder so obtained was 2.2 to 2.4.

EXAMPLE 3

100 parts of ω-aminocaproic acid was heated for 2 hours at 220° C. After cooling off, the polyamide or ω-aminocaproic acid so formed had a relative viscosity of 1.6. It was ground and condensed again as described in Example 2. The relative viscosity of the powder so obtained was 2.2.

We claim:
1. Process for the preparation, in uniformly round particle form, of a polyamide of relatively high viscosity, which comprises forming a partially condensed, brittle, low-molecular polycondensation product of a ω- aminocarboxylic acid lactam containing more than five carbon atoms in the lactam ring, grinding said brittle condensation product at a temperature within the range —50° C. to 150° C., to a powder having a grain size suitable for vortex sintering, and then completing the polymerization by heating said powder, in an inert atmosphere, at an elevated temperature at least as high as 140° C. but below the melting point of the polyamide thereby forming a polyamide powder of substantially increased viscosity the particles of which powder are discrete rounded grains of non-fibrous form, said powder being characterized by the fact that coatings made therefrom by the vortex-sintering method are not brittle.

2. Process as defined in claim 1 in which the polycondensation product powder is formed by grinding at a temperature not higher than 150° C. and in which the powder is heated at a temperature of from 140° C. up to a temperature 3° C. below its melting point.

3. The process defined in claim 1, in which said polycondensation product is formed from an admixture of said lactam and up to 50% by weight of a salt of hexamethylene diamine and adipic acid.

4. The process defined in claim 1, in which the heating of the powder is effected at a pressure of from 1 to 50,000 mm. mercury column per cm.$^2$.

References Cited

UNITED STATES PATENTS

| | | | |
|---|---|---|---|
| 3,015,651 | 1/1962 | Kjellmark | 260—78 |
| 3,155,637 | 11/1964 | Reichold et al. | 260—78 |

FOREIGN PATENTS

| | | |
|---|---|---|
| 650,468 | 10/1962 | Canada. |
| 1,048,026 | 12/1958 | Germany. |
| 1,089,163 | 9/1960 | Germany. |

HAROLD D. ANDERSON, Primary Examiner

U.S. Cl. X.R.

117—46; 260—96